United States Patent [19]

Whittle

[11] 3,979,169

[45] Sept. 7, 1976

[54] APPARATUS FOR REPAIRING TIRE CASINGS

[76] Inventor: Benjamin Whittle, R.R. No. 3, Paw Paw, Mich. 49079

[22] Filed: Oct. 30, 1970

[21] Appl. No.: 85,578

[52] U.S. Cl. ............................................. 425/12
[51] Int. Cl.² ........................................... B29H 5/16
[58] Field of Search ........... 18/18 C, 18 E; 152/369, 152/370; 425/12

[56] References Cited
UNITED STATES PATENTS

| 150,255 | 4/1874 | Phillips | 152/369 X |
|---|---|---|---|
| 1,000,524 | 8/1911 | Kaul | 152/369 |
| 1,096,535 | 5/1914 | Howard | 152/369 |
| 1,294,322 | 2/1919 | Swint | 152/369 |
| 1,545,033 | 7/1925 | Burdette | 152/370 X |
| 1,942,116 | 1/1934 | Mullen | 152/370 |
| 2,229,878 | 1/1941 | Wilson | 152/369 X |
| 2,411,558 | 11/1946 | Semler | 18/18 C |
| 2,421,096 | 5/1947 | Vogt | 18/18 C X |
| 2,837,767 | 6/1958 | MacDonald | 18/18 C |
| 3,577,592 | 5/1971 | Whittle | 18/18 C |

FOREIGN PATENTS OR APPLICATIONS

| 36,558 | 1926 | Denmark | 152/369 |
|---|---|---|---|
| 24,729 | 1922 | France | 152/369 |
| 431,462 | 1910 | France | 152/369 |
| 1,099,381 | 1961 | Germany | 152/370 |
| 29,177 | 1906 | United Kingdom | 152/369 |

*Primary Examiner*—J. Howard Flint, Jr.
*Attorney, Agent, or Firm*—Austin A. Webb

[57] ABSTRACT

Inner and outer patch forming plates of known shapes and contours are provided with a pin of a single size removably extending therebetween and through one plate, a nut on the end of the pin releasably clamps the plates together. The pin is formed integrally on the face of the inner plate and has a conical enlargement widening to the surface of the inner plate. Yieldable spring means are removably positioned between the nut and the outer surface of the outer plate.

6 Claims, 12 Drawing Figures

INVENTOR.
BenJamin Whittle
BY Austin A. Webb
ATTORNEY.

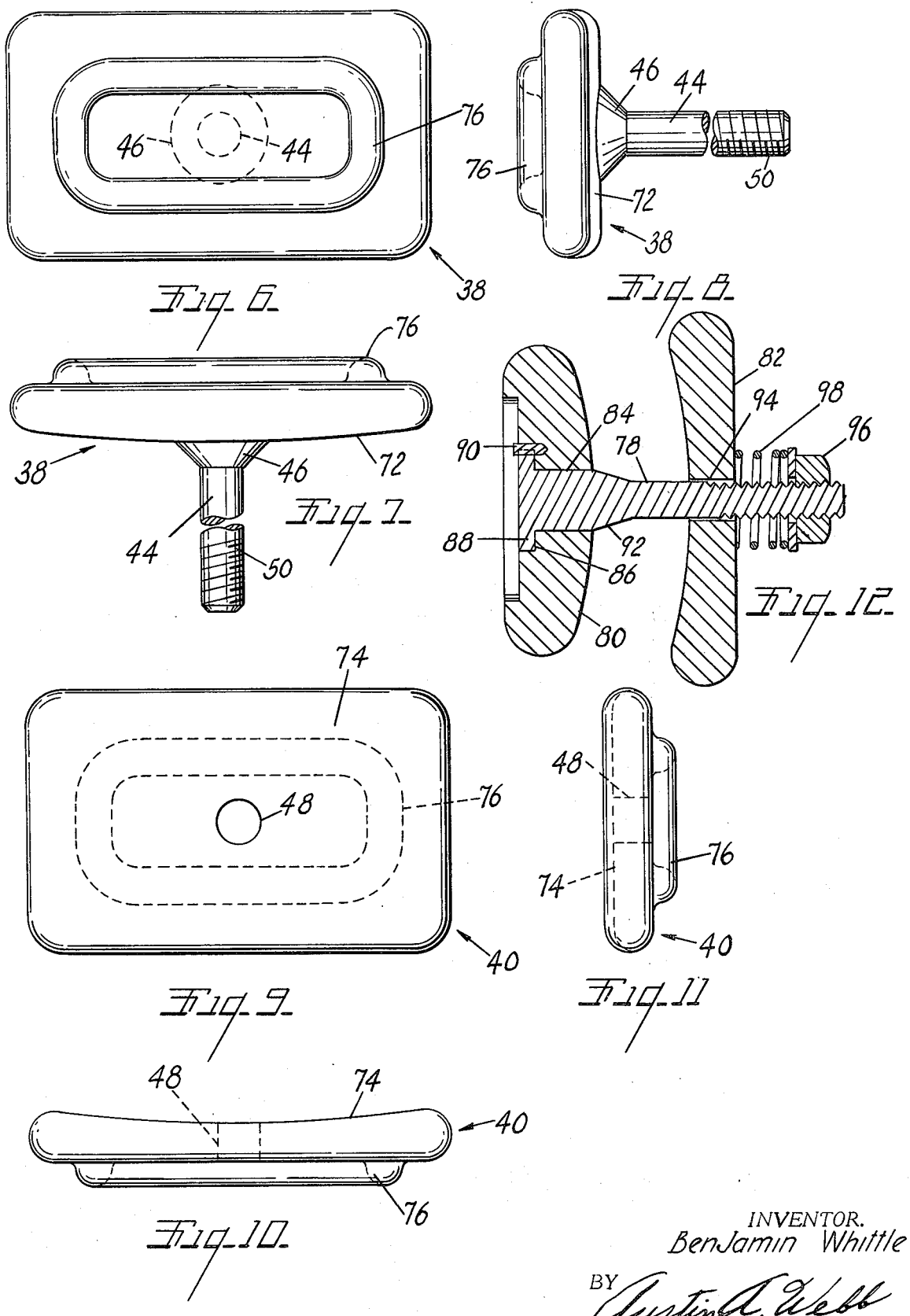

APPARATUS FOR REPAIRING TIRE CASINGS

RELATED APPLICATIONS

This application is filed in substitution for a similar application by applicant, Ser. No. 639,737, filed May 19, 1967, but previously abandoned. Part of the disclosure of this application is disclosed and claimed more fully in another application of applicant, Ser. No. 479,136, filed Aug. 12, 1965 which was co-pending with this application but which is now abandoned.

OUTLINE OF INVENTION

Instead of boring various sized holes through the casing, and then plugging the holes; the invention provides inner and outer patch plates with a standard size pin extending therebetween and through the break in the casing. The plates hold and cure filling compound in the break and around the pin, while clamp means such as a nut on the pin, clamp the plates to opposite sides of the casing and around the break. After curing, the plates and pin are removed, and a standard size plug is inserted into the hole left by the pin. Desirably, the pin and the corresponding inner portion of the plug have a conical enlargement or protuberance at the inner side of the casing. The pin may be formed integrally on the outer side of the inner plate, or may pass through holes in each plate with a retaining shoulder engaging one plate and a nut or clamp on the other end engageable with the opposite side of the other plate.

The principal objects of the invention are:

First, to provide patch plates which do not require external C-clamp supports.

Second, to provide patch plates with a coacting central clamping pin which both holds the plates against opposite surfaces of the casing to fill irregular sizes and shapes of breaks with filler compound, and cure the compound in the break of the casing, while forming a standardized plug opening radially through the break and the filling compound.

Other objects and advantages of the invention will be apparent from a consideration of the following description and claims.

The drawings of which there are two sheets illustrate the several steps for performing the patching operation of the invention and two alternative forms of the apparatus for performing the operation.

FIG. 6 is an inside elevational view of the inner patch plate shown in FIG. 4.

FIG. 7 is a fragmentary side elevational view of the inner plate shown in FIG. 6.

FIG. 8 is a fragmentary end elevational view of the inner plate projected from FIG. 6.

FIG. 9 is an inside elevational view of the outer patch plate shown in FIG. 4.

FIG. 10 is a side elevational view of the patch plate shown in FIG. 9.

FIG. 11 is an end elevational view of the outer patch plate projected from FIG. 9.

FIG. 12 is a cross sectional view through a modified form of the patch plates and connecting clamp structure shown in FIGS. 4 and 6 to 11.

Tire casings, particularly those of larger size and load carrying capacity are relatively expensive and it is common practice to repair breaks which may be formed at various positions in the casing.

Figure 1:
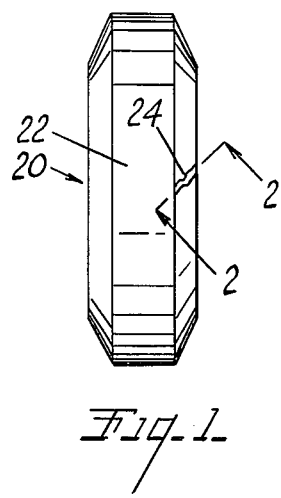
FIG. 1 is a conventional edge elevational view of a tire casing having a break therein.
Figure 2:
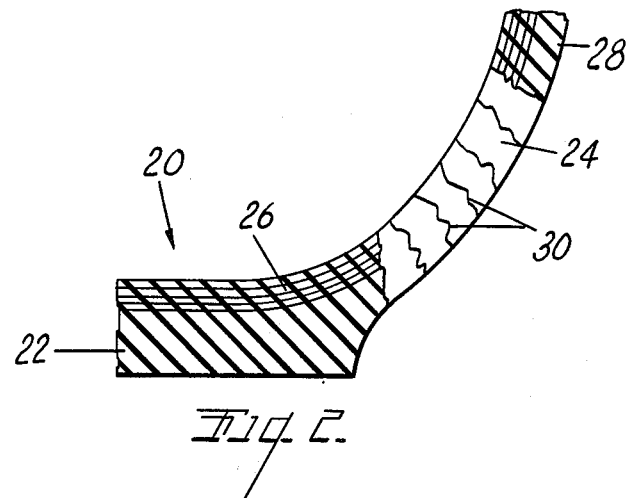
FIG. 2 is an enlarged fragmentary cross sectional view through the casing and the break along the line 2—2 in FIG. 1.
Figure 3:
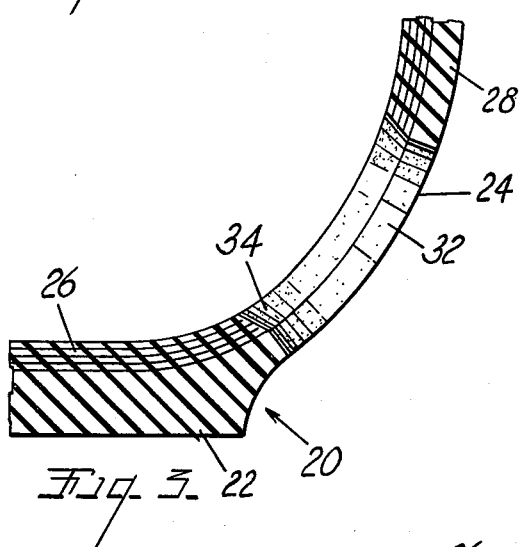
FIG. 3 is a fragmentary cross sectional view similar to FIG. 2 showing the edges of the break trimmed according to the first step in the use of the plates of the invention.

FIG. 1 conventionally illustrates a tire casing 20 having a peripheral tread portion 22 with a break 24 in one side wall of the casing. As appears in FIG. 2, the casing consists of an inner portion having a plurality of reinforced plies 26 over which the tread portion 22 extends with a covering of rubber 28 extending along the side wall of the casing. The shape, position, and nature of the break 24 is unpredictable depending upon what causes the break but will almost invariably have highly irregular edges indicated conventionally at 30 in FIG. 2. The break may also occur entirely or partially within the tread area of the casing.

The first step in the repair operation of the invention consists of trimming the edges of the break by grinding or skiving to provide a relatively smooth surface 32 around the edges of the break and to provide space for a pin and plug to be described to extend through the break. Desirably the inner edge of the sides of the break is beveled or chamfered to widen inwardly of the casing as at 34.

Figure 4:
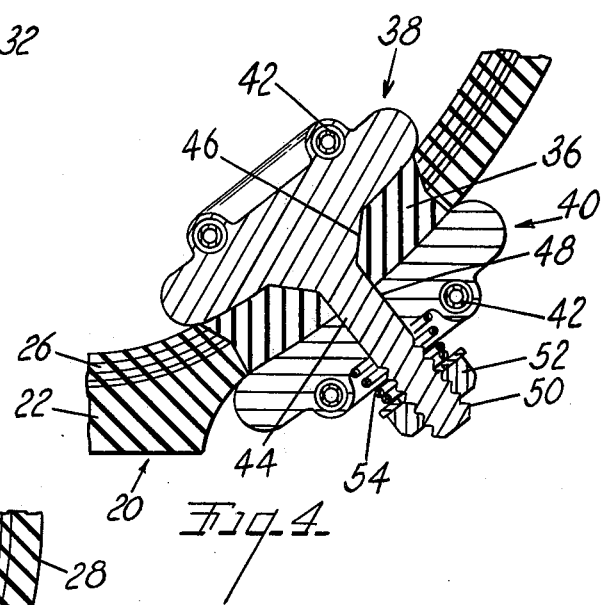
FIG. 4 is a fragmentary cross sectional view through the break in the casing showing the step of partially filling the break with filling compound and curing the compound in the break by means of one form of the apparatus of the invention.

After the sides of the break have been trimmed the space between the sides of the break is filled with a mass of flexible filling material 36 such as uncured rubber in plastic form and an inner patch plate indicated generally at 38 is laid in overlapping relation to the edges of the break and against the inside surface of the casing. An opposed outer patch plate indicated generally at 40 in FIG. 4 is laid in overlapping relation to the break over the outside surface of the casing. Patch plates of this general nature are well known and may be contoured to fit various portions of a tire casing and the patch plates 38 and 40 illustrated are examples only of one possible shape of patch plates usable in the repair operation. Commonly these patch plates are provided with means for applying heat to the filler compound 36 and in the examples each of the patch plates is provided with an electrical heating element 42. However, the heat for curing the filler compound could be supplied by steam, and in the case of some chemically curing compounds no heating is required.

The patch plates 38 and 40 differ from prior patch plates in that the inner patch plate 38 has an integral pin 44 projecting from the outer surface of the plate. The base or inner end of the pin is connected to the outer side of the plate portion by an inwardly enlarged conical protuberance 46. The outer plate 40 is provided with a central bore 48 through which the pin 44 extends and the outer end of the pin is threaded as at 50 to adjustably receive the clamping nut 52. The pin is long enough to project through the outer plate and coact with the nut when the plates are arranged over the tread portion of the casing. A coil spring 54 is compressed between the nut 52 and the outer surface of the outer plate to apply a yieldable compressive force between the inner and outer plates.

The sequence of inserting the filler compound 36 in the break and applying the inner and outer plates over the break is relatively unimportant as the tightening of the nut 52 will draw the protuberance 46 into the mass or body of the filler compound and expand the compound into intimate contact with the trimmed surfaces of the sides of the break. The spring 54 provides a constant pressure on the surfaces of the filler compound in case the compound flows during curing and adhesion to the sides of the break.

Figure 5:
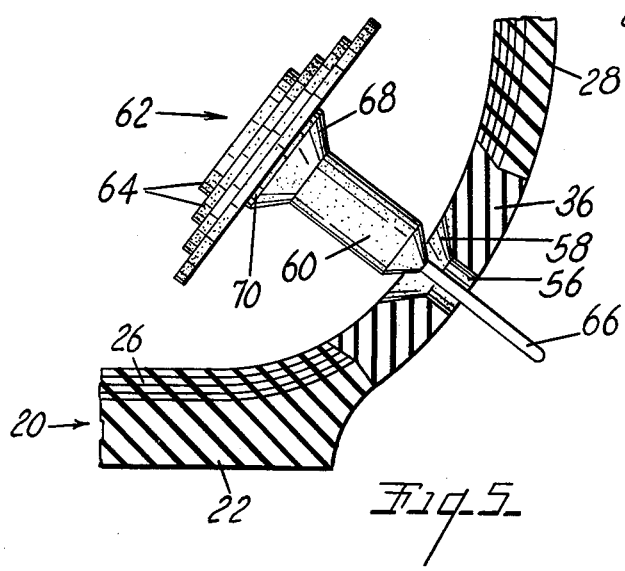
FIG. 5 is a fragmentary cross sectional view illustrating the initial filling compound cured in the break, with a final plug and patch ready to be inserted through the filling compound and adhered to the inside of the casing over the break.

As is shown in FIG. 5, the inner and outer plates 38 and 40 and the pin 42 with its enlargement 46 cure the mass 36 of filler material and cause it to adhere to the edges of the break, while at the same time forming a bore or hole 56 generally perpendicular through the wall of the casing with an inwardly opening tapered enlargement 58 at the inner end of the bore. The casing with the filler material 36 thus cured and shaped is then ready to receive a plug 60 of yieldable material such as partially cured raw rubber with an inner cover patch 62 consisting of plural plies of fabric or cord reinforced rubber 64 secured to the inner end of the plug. The diameter of the plug 60 is somewhat larger than the diameter of the hole 56 and a pulling element or prong 66 projects from the end of the plug for pulling the plug through the hole 56. The plug 60 differs from prior plugs in that there is a conical enlargement 68 at its inner end which corresponds to the shape of the enlargement 58 at the inner end of the hole 56. A layer of bonding or connecting material between the inner end of the plug and the outer surface of the patch 62 is conventionally illustrated at 70, but the plug may be formed as an integral part of the surface of the patch.

Desirably the patch 62 has the properties of a laminated patch such as is described and claimed more fully in my copending application, Serial No. 479,136, referred to above for Patch For Tires, but since the application of the plug and patch to the casing follows known procedures the steps of applying and securing the patch and plug is not shown in greater detail.

The construction of the inner patch plate 38 is shown in greater detail in FIGS. 6 through 8 in which the essential elements of the plate are identified as previously described. The outer surface of the plate is contoured convexly as at 72 but again the particular shape or contour shown is an example only of a variety of shapes and contours which may be provided.

FIGS. 9, 10 and 11 illustrate the shape and construction of the outer plate 40 in greater detail including the generally concave inner face 74 which is opposed to the outer face 72 of the inner plate. The heating elements 42 or other heating means may be enclosed in ribs 76 formed on the surfaces of the patch plates.

FIG. 12 illustrates an alternative form of patch plate apparatus adapted to perform the several steps of the operation. The view is in cross section through the connecting pin 78 and the adjacent portions of the inner patch plate 80 and the outer patch plate 82. The inner plate 80 has a stepped bore 84 formed centrally therethrough to provide an inwardly facing shoulder 86. The inner end of the pin 78 has an enlarged head portion 88 seated against the shoulder 86 and desirably an anti-rotation lock pin 90 fits into mating recesses in the edges of the head and the adjacent portion of the inner plate.

At the outer surface of the inner plate 80 the shank of the pin 78 tapers outwardly as at 92 to form a protuberance that will form the enlarged beveled opening 58 in the filler compound. The outer patch plate 82 is provided with a central bore or hole 94 which receives the outer end of the pin 78, and the extreme outer end of the pin is threaded to receive the clamping nut 96 with the spring or yieldable element 98 between the nut and the outer surface of the outer plate.

The modified form of the patch plate structure shown in FIG. 12 functions to form the mass of filler material 36 within the break in the casing as previously described. It will be appreciated that various modifications in the patch plate and connecting structure may be made without departing from the scope or theory of the invention as hereinafter claimed. For example, the connecting pins 44 and 78 may be anchored to the outer patch plate instead of the inner patch plate, with the clamp nut 52 or 96 coacting with the inner patch plate. The tapered protuberance 46 or 92 may be formed as a separate element sleeved around a pin having a shank of uniform diameter. In the case of patch plates designed for repairing extremely long breaks 24, more than one connecting pin and associated clamp means may be provided between the inner and outer clamp plates.

What is claimed as new is:

1. Apparatus for use in preparation of tires for repairing breaks in the tire casings comprising
   inner and outer mold plates adapted to be clamped in opposed non-penetrating relation against inner and outer surfaces of a casing and in overlapping relation to the edges of a break in the casing,
   a pin extending from one of said plates to project through the break in the casing and the other of said plates when the plates are lapped against the inside and outside of the casing,
   the other of the plates having a hole formed therethrough to slidably pass the shank of the pin,
   means coacting with the end of said pin and the opposite side of the other of said plates for clamping said plates to the opposite sides of a casing,
   and means forming an outwardly tapering annular protuberance at the outer side of said inner plate located around the axis of said pin and extending axially no more than half the thickness of the casing to be repaired.

2. Apparatus as defined in claim 1 in which said pin and said protuberance are formed integrally on the outer side of said inner plate.

3. Apparatus as defined in claim 2 in which one of said plates has means incorporated therewith for heating said one plate.

4. Apparatus as defined in claim 2 in which said means for clamping said plates comprises a threaded portion on said pin, and a nut engageable with said threaded portion.

5. Apparatus as defined in claim 1 in which said inner plate has a hole formed therethrough,
   said pin having a headed shank received in the hole in said inner plate.

6. Apparatus as defined in claim 5 in which the shank of said pin has an outwardly tapered portion forming said protuberance and projecting from the outer surface of said inner plate when said pin is seated in the hole in the inner plate.

* * * * *